(12) United States Patent
Nagasawa

(10) Patent No.: US 12,617,410 B2
(45) Date of Patent: May 5, 2026

(54) DRIVER ASSISTANCE APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 225 days.

(21) Appl. No.: 18/299,964

(22) Filed: Apr. 13, 2023

(65) Prior Publication Data

US 2023/0347905 A1 Nov. 2, 2023

(30) Foreign Application Priority Data

Apr. 29, 2022 (JP) ................................. 2022-075526

(51) Int. Cl.
*B60W 40/08* (2012.01)
*B60W 30/18* (2012.01)
*B60W 50/08* (2020.01)

(52) U.S. Cl.
CPC ...... *B60W 40/08* (2013.01); *B60W 30/18145* (2013.01); *B60W 50/085* (2013.01); *B60W 2510/22* (2013.01); *B60W 2520/14* (2013.01); *B60W 2530/10* (2013.01); *B60W 2530/20* (2013.01); *B60W 2540/225* (2020.02); *B60W 2552/30* (2020.02); *B60W 2556/10* (2020.02)

(58) Field of Classification Search
CPC ......... B60W 30/18145; B60W 50/085; B60W 2556/10; B60W 2540/225; B60W 2552/30; B60W 2510/22; B60W 2520/14
See application file for complete search history.

(56) References Cited

U.S. PATENT DOCUMENTS

2010/0209891 A1* 8/2010 Lin .......................... G09B 9/05
434/66
2015/0336587 A1 11/2015 Inoue et al.
(Continued)

FOREIGN PATENT DOCUMENTS

JP 2003-099897 A 4/2003
JP 2004-114918 A 4/2004
(Continued)

OTHER PUBLICATIONS

Notice of Reasons for Refusal issued in corresponding Japanese Patent Application No. 2022-075526, dated Dec. 16, 2025.

*Primary Examiner* — Wade Miles
*Assistant Examiner* — Jerrod Irvin Davis
(74) *Attorney, Agent, or Firm* — Rimon P.C.

(57) ABSTRACT

A driver assistance apparatus includes an environment recognition unit, a travel state detection unit, a driver assistance control unit, and a driving skill estimation unit. The driver assistance control unit makes a driver assistance control based on an output of the environment recognition unit regarding the environment and an output of the travel state detection unit regarding travel state. The driver assistance control includes assisting a driver in driving in one or both of entering a curved road and traveling along the curved road. The driver assistance control unit changes contents of the driver assistance control, in accordance with the driving skill of the driver estimated by the driving skill estimation unit. The driving skill estimation unit makes the estimation of the driving skill at least once in each driving cycle of the vehicle.

16 Claims, 10 Drawing Sheets

POSITIONAL CHANGES IN GAZE DIRECTION OR CENTRAL VISUAL FIELD

LOW DRIVING SKILL

ANGLE IN VERTICAL DIRECTION

ANGLE IN HORIZONTAL DIRECTION

HIGH DRIVING SKILL

ANGLE IN VERTICAL DIRECTION

ANGLE IN HORIZONTAL DIRECTION

(56) References Cited

U.S. PATENT DOCUMENTS

| | | | | |
|---|---|---|---|---|
| 2018/0284767 A1 * | 10/2018 | Minegishi | ........... | B60W 30/182 |
| 2020/0043340 A1 * | 2/2020 | Agnew | ................. | B60K 28/06 |
| 2020/0198649 A1 * | 6/2020 | Emura | ................. | B60W 50/00 |
| 2021/0179113 A1 | 6/2021 | Kishi | | |
| 2021/0245769 A1 * | 8/2021 | Yamaoka | .......... | B60W 30/0956 |

FOREIGN PATENT DOCUMENTS

| | | | | |
|---|---|---|---|---|
| JP | 2007-155504 A | | 6/2007 |
| JP | 2007-210437 A | | 8/2007 |
| JP | 2008222055 A | * | 9/2008 |
| JP | 2015-219830 A | | 12/2015 |
| JP | 2021-093033 A | | 6/2021 |

* cited by examiner

POSITIONAL CHANGES IN GAZE DIRECTION OR CENTRAL VISUAL FIELD

LOW DRIVING SKILL

ANGLE IN HORIZONTAL DIRECTION

ANGLE IN VERTICAL DIRECTION

HIGH DRIVING SKILL

ANGLE IN HORIZONTAL DIRECTION

ANGLE IN VERTICAL DIRECTION

START

S01 — VEHICLE CALIBRATION

S02 — OCCUPANT CALIBRATION

S03 — START TO COMPARE CURRENT POSITION WITH MAP DATA

S04 — START TO ACQUIRE VEHICLE SPEED

S05 — START TO DETECT VEHICLE POSITION AND ANGLE

S06 — START TO DETECT GAZE DIRECTION

S07 — START TO DETECT VEHICLE BEHAVIOR

S08 — START TO DETECT ONCOMING VEHICLE

END

DRIVER ASSISTANCE APPARATUS

CROSS-REFERENCE TO RELATED APPLICATIONS

The present application claims priority from Japanese Patent Application No. 2022-075526 filed on Apr. 29, 2022, the entire contents of which are hereby incorporated by reference.

BACKGROUND

The disclosure relates to a driver assistance apparatus that makes a driver assistance control of a vehicle such as an automobile.

As a technique relating to driver assistance for a vehicle such as an automobile, for example, Japanese Unexamined Patent Application Publication (JP-A) No. 2003-99897 describes a curve travel assistance apparatus that determines a level of a driver's skill and controls driver assistance in accordance with the level. The level of the driver's skill is based on, for example, an amount of a brake operation and an amount of steering by the driver in traveling along a curve, an average value of an amount of displacement from a target track, and a variance value of a vehicle speed. JP-A No. 2003-99897 also describes skill evaluation in consideration of lane keeping, and driver assistance in accordance with the skill.

JP-A No. 2015-219830 describes a driver assistance apparatus that provides driver assistance in lane keeping. The driver assistance apparatus assists in steering and braking, and sets, or weights, an amount of assistance in accordance with a driver's skill estimated in advance.

JP-A No. 2007-210437 describes a technique of estimating a driver's ability to return to inside a lane. When the ability is low, assistance is switched from a steering torque assistance control to a vehicle stabilization control. JP-A No. 2007-210437 also describes a technique of estimating a driving ability in accordance with relation between assistance torque and the driver's driving operation in response to the assistance torque.

JP-A No. 2021-93033 describes a driving consciousness estimation apparatus that monitors a gaze area of a driver and records sideward gazing time. Based on the sideward gazing time thus recorded, the driving consciousness estimation apparatus estimates quality of a manual driving ability as a space recognition ability.

SUMMARY

An aspect of the disclosure provides a driver assistance apparatus including an environment recognition unit, a travel state detection unit, a driver assistance control unit, and a driving skill estimation unit. The environment recognition unit is configured to recognize environment around a vehicle. The travel state detection unit is configured to detect a travel state of the vehicle. The driver assistance control unit is configured to make a driver assistance control based on an output of the environment recognition unit regarding the environment and an output of the travel state detection unit regarding travel state. The driver assistance control includes assisting a driver in driving in one or both of entering a curved road and traveling along the curved road. The driving skill estimation unit is configured to make estimation of driving skill of the driver. The driver assistance control unit is configured to change contents of the driver assistance control, in accordance with the driving skill of the driver estimated by the driving skill estimation unit. The driving skill estimation unit is configured to make the estimation of the driving skill at least once in each driving cycle of the vehicle.

An aspect of the disclosure provides a driver assistance apparatus including circuitry. The circuitry is configured to: recognize environment around a vehicle; detect a travel state of the vehicle; make a driver assistance control based on the environment around the vehicle and the travel state of the vehicle. The driver assistance control includes assisting a driver in driving in one or both of entering a curved road and traveling along the curved road The circuitry is configured to make estimation of driving skill of the driver. The circuitry is configured to change contents of the driver assistance control, in accordance with the estimated driving skill of the driver. The circuitry is configured to make the estimation of the driving skill at least once in each driving cycle of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
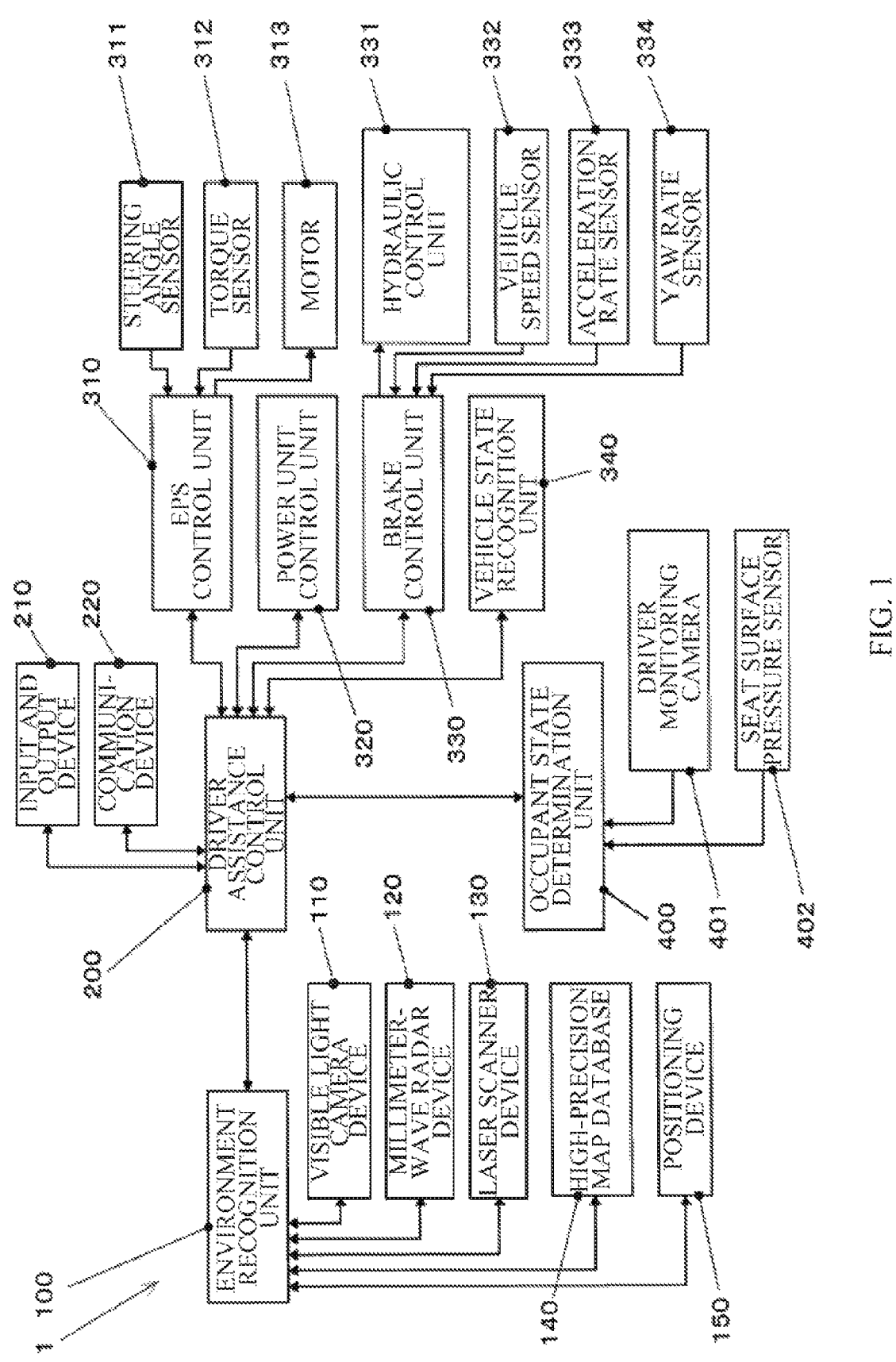
FIG. 1 is a diagram schematically illustrating a system configuration of a vehicle including a driver assistance apparatus according to an embodiment of the disclosure.

For example, various driver assistance apparatuses, control apparatuses of braking and driving forces of each wheel, and control apparatuses of suspensions, etc. have made driving an automobile easy enough to perform driving faithfully to an intention of a driver without necessitating a particularly high degree of skill.

This, however, assumes that the driver is able to make a series of basic driving operations. For example, when traveling along a curved road, such basic driving operations may include an action of checking by visual recognition of the surroundings of the vehicle, a speed control by a brake operation, applying a steering angle by turning a steering wheel, a speed control by an accelerator operation, and reducing the steering angle by returning the steering wheel.

For example, as for not so highly skilled drivers such as unexperienced drivers or some of elderly drivers, it is desirable to permit frequent intervention by a driver assistance control. In particular, when traveling along a curve, constant intervention by the driver assistance control would be desirable in an extreme case.

However, if the same driver assistance control is carried out for all drivers, relatively highly skilled drivers would feel as if a degree of freedom of driving operations was restricted.

Accordingly, it is effective to change contents of the driver assistance in accordance with the driving skill of the driver. But even the same driver's driving skill may keep changing because of everyday body condition, and fatigue and emotional change.

It is desirable to provide a driver assistance apparatus that makes it possible to provide appropriate driver assistance corresponding to changes in driving skill of a driver.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

A driver assistance apparatus according to an embodiment may be provided for a four-wheel vehicle such as a passenger car.

FIG. 1 schematically illustrates a system configuration of a vehicle including a driver assistance apparatus including the driving skill estimation device according to the embodiment.

A vehicle 1 may include, for example, an environment recognition unit 100, a driver assistance control unit 200, an electric power steering (EPS) control unit 310, a power unit control unit 320, a brake control unit 330, a vehicle state recognition unit 340, and an occupant state determination unit 400.

These units may include a microcomputer including, for example, a data processor such as a central processing unit (CPU), a storage unit such as a random access memory (RAM) and a read only memory (ROM), input and output interfaces, and a bus that couples them together.

The units are configured to communicate with one another through an in-vehicle local area network (LAN) or communicate directly with one another. The in-vehicle LAN may include, for example, a controller area network (CAN) communication system.

The environment recognition unit 100 may recognize environment around the vehicle based on outputs of, for example, various sensors.

The environment to be recognized around the vehicle may include, for example, data regarding lane shapes of roads on which the vehicle 1 travels, and relative positions and relative speeds, etc. of various obstacles with respect to the vehicle.

To the environment recognition unit 100, for example, a visible light camera device 110, a millimeter-wave radar device 120, a laser scanner device 130, a high-precision map database 140, and a positioning device 150 may be coupled.

In one embodiment of the disclosure, the environment recognition unit 100 may serve as an "environment recognition unit" and a "yaw angle detection unit".

The visible light camera device 110 may be an imaging device that captures images of the surroundings of the vehicle, e.g., images of a forward view, a rearward view, and/or a sideward view, with a visible light camera such as a stereo camera or a monocular camera.

The visible light camera device 110 may carry out image processing on the captured image to detect, for example, presence or absence of an object around the vehicle, a relative position and a relative speed of the object with respect to the vehicle, and the lane shapes.

The millimeter-wave radar device 120 may be a radar device that uses radio waves in a frequency band of, for example, 30 GHz to 300 GHz. The millimeter-wave radar device 120 may detect the presence or absence of an object and the relative position of the object with respect to the vehicle.

The laser scanner device 130 may send out, for example, pulses of near-infrared laser light to scan the surroundings of the vehicle, and detect, for example, the presence or absence of an object, the relative position of the object with respect to the vehicle, and a shape of the object, based on presence or absence of reflected light and a time difference between the sending out of the pulses and the return of the reflected light.

The high-precision map database 140 may accumulate data related to high-precision three-dimensional map data (a HD map) within a range assumed to be traveled by the vehicle 1.

This data may include, for example, three-dimensional data including data regarding latitude, longitude, and altitude of lanes, road shoulder edges, lane lines, etc. with resolution on the order of, for example, centimeters. The lane lines may include so-called white lines.

The positioning device 150 may include, for example, a receiver of a quasi-zenith satellite system such as the global positioning system (GPS), a road-to-vehicle communication device, and a gyro-sensor for autonomous navigation. The positioning device 150 may detect a current position of the vehicle 1.

The driver assistance control unit 200 may make a driver assistance control based on the environment around the vehicle, a travel state of the vehicle 1, and driving skill of a driver D who drives the vehicle 1. The environment around the vehicle is recognized by the environment recognition unit 100. The travel state of the vehicle 1 is recognized based on outputs of each unit and sensors described later.

The driver assistance control may include, for example, an information offering control and a travel assistance control of the vehicle. The information offering control may include offering information to the driver D by, for example, images, sound, or vibration. The travel assistance control of the vehicle may include, for example, a braking force control, an output control of a travel power source, and a steering control.

To the driver assistance control unit 200, an input and output device 210 and a communication device 220 may be coupled.

The input and output device 210 may include, for example, an output device and an input device. Non-limiting examples of the output device may include an image display device that also serves as an input device, and an audio speaker. Such an image display device may include, for example, a touch screen display. Non-limiting examples of the input device may include a physical switch and an audio microphone.

The input and output device 210 may further include a head-up display (HUD) device. The head-up display may perform image display in superimposition on a direct visual field to be visually recognized by the driver D through a windshield.

This allows the driver D to make various settings related to the driver assistance control and receive various kinds of information, with the use of the input and output device 210.

The communication device 220 may communicate with a base station provided outside the vehicle by, for example, a wireless communication line to transmit and receive various pieces of data.

The electric power steering control unit 310 may make a control of supplying an unillustrated steering device with an assistance force corresponding to a steering operation by the driver D and a steering force on the occasion of automatic steering. The steering device may steer steering wheels of the vehicle 1. In one example, the steering wheels of the vehicle 1 may be, for example, front wheels.

To the electric power steering control unit 310, for example, a steering angle sensor 311, a torque sensor 312, and a motor 313 may be coupled.

The steering angle sensor 311 may detect a steering angle in the steering device.

The torque sensor 312 may detect torque to be applied to a steering shaft. To the steering shaft, an unillustrated steering wheel with which the driver D makes the steering operation is coupled.

The electric power steering control unit 310 may generate the assistance force in accordance with the torque detected by the torque sensor 312.

The motor 313 may be an electric actuator that applies the assistance force and the steering force to the steering device to generate a rack thrust force.

An output of the motor 313 may be controlled by the electric power steering control unit 310.

The power unit control unit 320 may make a general control of the travel power source of the vehicle 1 and its auxiliaries.

As the travel power source, for example, an internal combustion engine (ICE), an electric motor, a hybrid system of an engine and an electric motor, etc. may be used.

The power unit control unit 320 may set request torque based on, for example, an amount of an operation of an unillustrated accelerator pedal, and control the travel power source to allow actual torque generated by the travel power source to match the request torque.

The brake control unit 330 may control, individually for each wheel, braking forces of brake devices respectively provided on right front, left front, right rear, and left rear wheels of the vehicle.

The brake device may include, for example, a hydraulic disc brake.

To the brake control unit 330, for example, a hydraulic control unit 331, a vehicle speed sensor 332, an acceleration rate sensor 333, and a yaw rate sensor 334 may be coupled.

The hydraulic control unit 331 may be a hydraulic pressure control device that individually adjusts brake fluid pressure of an unillustrated wheel cylinder of each of the wheels.

The hydraulic control unit 331 may include an electric pump that applies pressure to brake fluid. The hydraulic control unit 331 may also include valves that control the brake fluid pressure of the wheel cylinder of each of the wheels. Such valves may include, for example, a pressure-increasing valve, a pressure-reducing valve, and a pressure-holding valve.

To the hydraulic control unit 331, for example, an unillustrated master cylinder and the wheel cylinders may be coupled through a brake fluid pipe.

The master cylinder may apply pressure to the brake fluid, in accordance with an operation of an unillustrated brake pedal with which the driver makes a brake operation.

The brake fluid pressure generated by the master cylinder is transmitted to the wheel cylinders through the hydraulic control unit 331.

The hydraulic control unit 331 may perform an override on the brake fluid pressure generated by the master cylinder, to increase and decrease the brake fluid pressure of each of the wheel cylinders.

The wheel cylinders may be provided for their respective wheels. For example, the wheel cylinders may press a brake pad against a disc rotor to generate a friction force, or a braking force, corresponding to the brake fluid pressure.

The vehicle speed sensor 332 may be provided at a hub that rotatably supports each of the wheels. The vehicle speed sensor 332 may generate a vehicle speed signal corresponding to a rotation speed of each of the wheels.

The acceleration rate sensor 333 may detect a longitudinal acceleration rate and a lateral, or vehicle-widthwise, acceleration rate, each acting on a vehicle body.

The yaw rate sensor 334 may detect a yaw rate, i.e., an angular speed of rotation or yawing around a vertical axis of the vehicle body.

The vehicle state recognition unit 340 may recognize characteristics of a suspension and a tire of each wheel of the vehicle, and a load state and weight distribution of the vehicle.

As the characteristics of the suspension and the tire, the vehicle state recognition unit 340 may recognize, for example, a spring constant and a damping characteristic.

For example, when the suspension is a pneumatic suspension using an air spring, the vehicle state recognition unit 340 may estimate the spring constant based on internal pressure of the air spring. When a metal spring is used as the suspension spring, the spring constant is a predetermined value.

Moreover, when a damper, i.e., a shock absorber, is a damping force adjustment damper, the vehicle state recognition unit 340 may recognize the damping force characteristic, based on a setting state of a damping force variable mechanism. The damper is a damping element provided at the suspension.

As for the tire, the vehicle state recognition unit 340 may detect air pressure, to estimate the spring constant and the damping characteristic, with the use of known tire characteristic data.

The vehicle state recognition unit 340 may detect the load state of the vehicle, e.g., a total weight of the vehicle, and the weight distribution to each wheel with the use of, for example, a stroke sensor provided at the suspension device of each wheel.

For example, the vehicle state recognition unit 340 may detect the load state of each wheel from the spring constant of the suspension device and a stroke of the suspension with respect to a predetermined reference state.

In one embodiment of the disclosure, the electric power steering control unit 310, the power unit control unit 320, the brake control unit 330, and the vehicle state recognition unit 340 described above may serve as a "travel state detection unit" that detects the travel state of the vehicle 1 in cooperation with the environment recognition unit 100.

The occupant state determination unit 400 may determine, for example, a consciousness state, an emotional state, and a health state of an occupant, e.g., the driver D.

Moreover, the occupant state determination unit 400 may detect a gaze direction of the driver.

To the occupant state determination unit 400, for example, a driver monitoring camera 401 and a seat surface pressure sensor 402 may be coupled.

Figure 2:
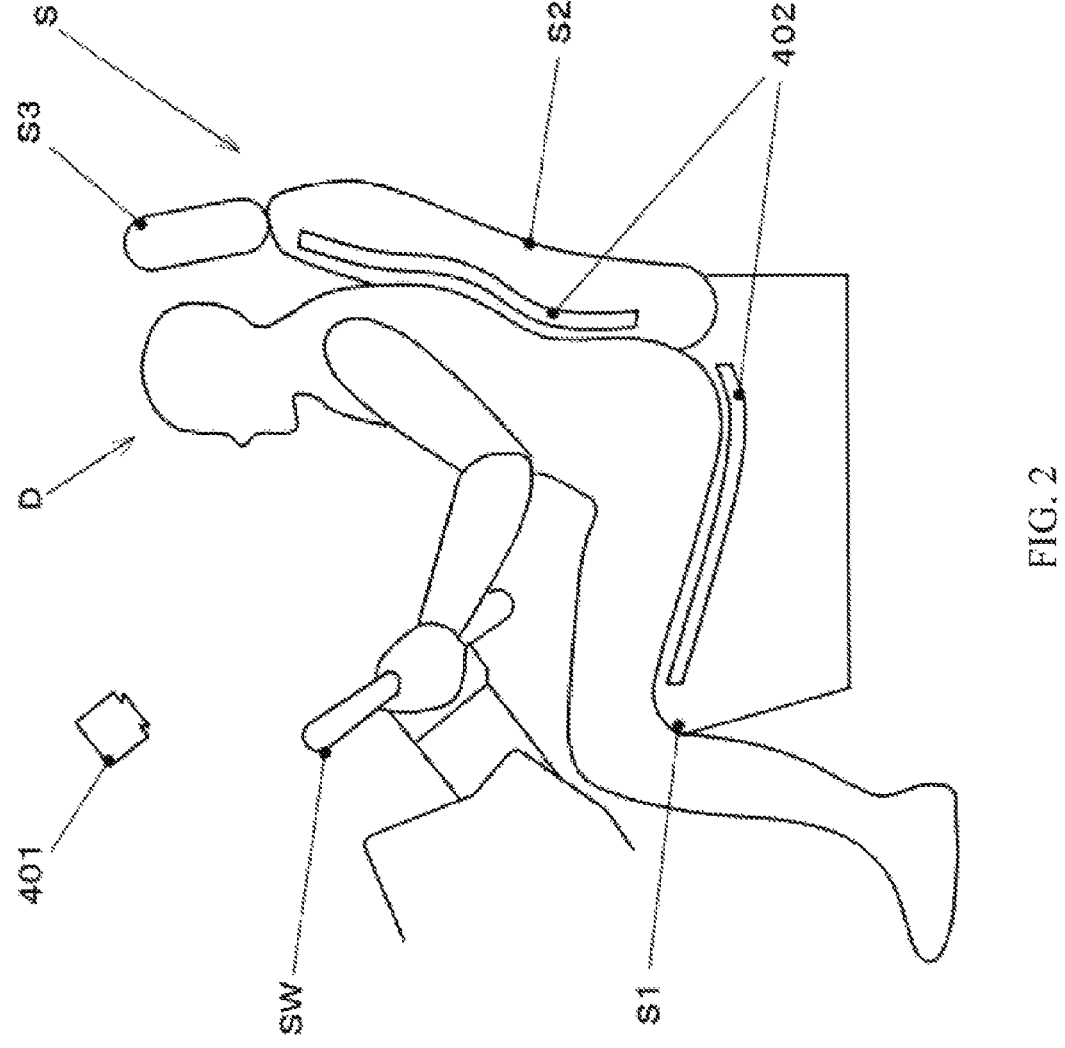
FIG. 2 is a diagram schematically illustrating arrangement of a driver monitoring camera and a seat surface pressure sensor in the driver assistance apparatus according to the embodiment.

FIG. 2 schematically illustrates arrangement of the driver monitoring camera 401 and the seat surface pressure sensor 402 in the driver assistance apparatus according to the embodiment.

The vehicle 1 may include a seat S on which the driver D is to be seated.

The seat S may include, for example, a seat cushion S1, a backrest S2, and a headrest S3.

The seat cushion S1 may be a seat surface portion on which the thighs, the buttocks, etc. of the driver D are to be placed.

The backrest S2 may be a portion that comes into contact with the back of the driver D and hold the upper body of the driver D.

The backrest S2 may protrude upward and diagonally rearward from the vicinity of a rear part of the seat cushion S1.

The headrest S3 may be disposed behind the head of the driver D. The headrest S3 may hold the head when the head moves backward.

The headrest S3 may be disposed to protrude upward from an upper end of the backrest S2.

The driver monitoring camera 401 may be an imaging device that captures an image of the driver D from the front of the vehicle.

The driver monitoring camera 401 may be disposed to include, in an imaging angle of view, the face of the driver D and the hands of the driver D in a state of holding a steering wheel SW.

The driver monitoring camera 401 may include, for example, a solid-state image sensor such as a complementary metal oxide semiconductor (CMOS) or a charge-coupled device (CCD), an optical system such as a lens group, and a driver circuit and an output processing circuit for the solid-state image sensor. The lens group may form a subject image on the solid-state image sensor.

The seat surface pressure sensor 402 may be provided at the seat cushion S1 and the backrest S2. The seat surface pressure sensor 402 may measure distribution of seat surface pressure to be received from the driver D by an upper surface of the seat cushion S1 and a front surface of the backrest S2.

Moreover, the occupant state determination unit 400 may include other sensors than these sensors.

For example, a sensor may be provided that acquires, for example, various kinds of biometric data, i.e., so-called vital signs, and an alcohol concentration in exhaled air. Non-limiting examples of the biometric data may include a heart rate, a body temperature, blood pressure, and a blood oxygen saturation level of the occupant.

The occupant state determination unit 400 may determine the gaze direction and the driving skill of the occupant, based on, for example, data regarding the environment around the vehicle, the travel state of the vehicle 1, and an occupant state. The gaze direction means a position of a central visual field. The data regarding the environment around the vehicle is recognized by the environment recognition unit 100. Non-limiting examples of the travel state of the vehicle 1 may include the data detected by the various sensors. The occupant state is detected by, for example, the driver monitoring camera 401 and the seat surface pressure sensor 402.

The occupant state determination unit 400 may estimate quality of the driving skill of the occupant based on, for example, changes in the gaze direction. The gaze direction means a direction from the eye toward the central visual field.

Figures 3A, 3B:
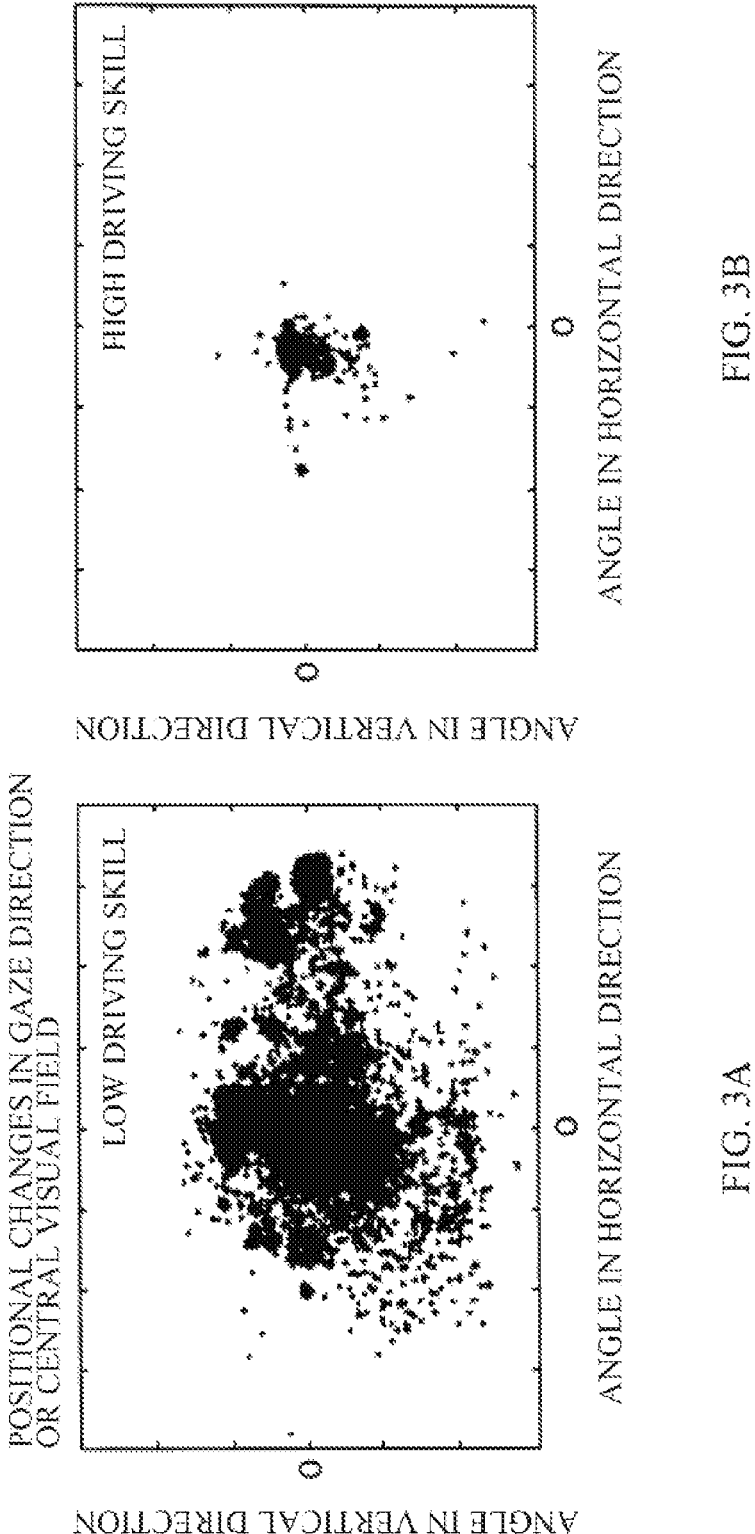
FIGS. 3A and 3B are diagrams illustrating examples of a position history of a central visual field of a driver while the vehicle is traveling on a general road.

FIGS. 3A and 3B illustrate examples of a position history of the central visual field of the driver while the vehicle is traveling on a general road.

FIG. 3A illustrates data regarding a low skilled driver having relatively low driving skill, and FIG. 3B illustrates data regarding a highly skilled driver having relatively high driving skill.

In FIGS. 3A and 3B, the horizontal axes indicate an angle in a horizontal direction, and the vertical axes indicate an angle in a vertical direction.

As illustrated in FIGS. 3A and 3B, it can be seen that the gaze direction of the low skilled driver has a larger amount of the changes and higher frequency of the changes than the gaze direction of the highly skilled driver.

Some reasons for this may include: that the low skilled driver is not able to appropriately determine where to gaze at while driving; that the low skilled driver is not able to check the surrounding environment by a peripheral visual field while stabilizing the central visual field; and that the low skilled driver tends to excessively gaze at a region close to the vehicle.

In the meanwhile, it has been found that even the highly skilled driver sometimes has significant horizontal movement of the gaze direction because of, for example, poor visibility. Non-limiting examples with poor visibility may include a blind corner where an exit from a curved road is invisible, or an intersection with a road where someone may rush out.

Thus, the occupant state determination unit 400 may estimate the driving skill based on the vertical changes in the gaze direction of the occupant. The gaze direction means the direction toward the central visual field.

For example, the occupant state determination unit 400 may assume, for example, a variance and a standard deviation of a gaze position in the vertical direction, frequency of the vertical movement of gaze, an average value of an amount of the vertical movement of the gaze, as parameters. Thus, the occupant state determination unit 400 may estimate that the driving skill is low, in accordance with an increase in an average value of the parameters within a predetermined period of time.

Moreover, the occupant state determination unit 400 may estimate the driving skill with the use of multiple parameters in combination. For example, the occupant state determination unit 400 may compare a weighted sum of the multiple parameters with a predetermined threshold value to determine the driving skill.

The occupant state determination unit 400 may perform predetermined image processing on the images captured by the driver monitoring camera 401 to detect the vertical changes in the gaze direction of the occupant.

The image processing to detect the gaze direction may include, for example, detecting the center position of the eyeball and the center position of the pupil from the image of the eyes of the occupant, estimating a direction in which the pupil is directed from a deviation between the center position of the eyeball and the center position of the pupil, and assuming the estimated direction to be the gaze direction.

Instead of, or in addition to, the estimation of the gaze direction with the use of the position of the pupil described above, the occupant state determination unit 400 may estimate a skeleton state of the occupant from the images, and estimate the gaze direction from the skeleton state.

Figure 4:
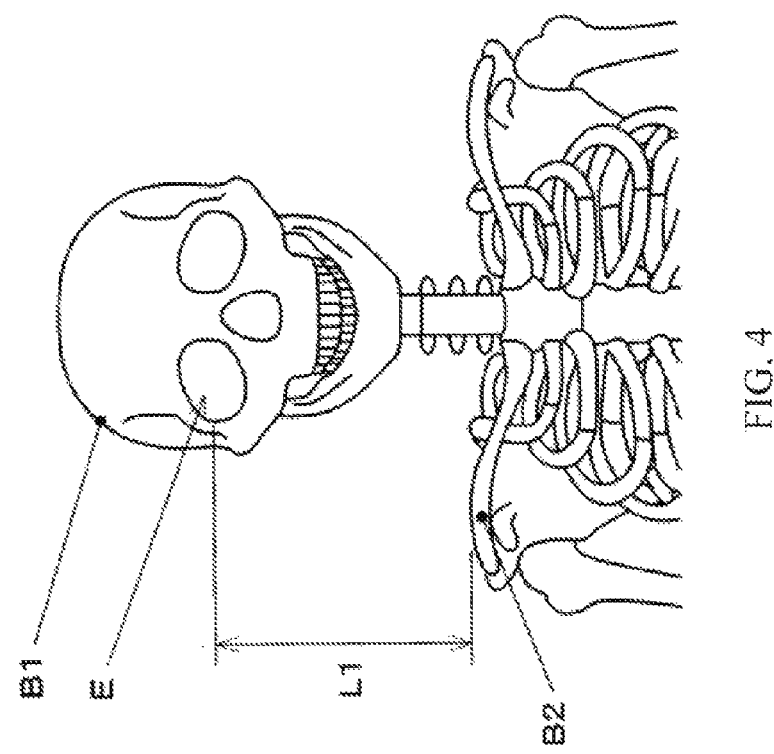
FIG. 4 is a diagram schematically illustrating a skeleton of an occupant as viewed from front.

FIG. 4 schematically illustrates a skeleton of an occupant as viewed from front.

In general, when the occupant is mainly looking at something nearby, i.e., when the gaze direction lowers, the driver is getting nervous, or the shoulder of the driver tends to rise.

Thus, the occupant state determination unit 400 may estimate a distance L1 between a position of the eyes E of the skull B1 and an upper portion of the clavicle B2 based on the images captured by the driver monitoring camera 401, and estimate that the gaze direction lowers in accordance with a decrease in the distance L1.

In estimating the gaze direction in this way, positional relation between the eyes E and the clavicle B2 may sometimes change depending on, for example, individual differences, a degree of fatigue, a degree of nervousness of the driver.

To cope with this, for example, the occupant state determination unit 400 may initialize the parameters to be involved in a logic of the detection of the gaze direction when the vehicle 1 is stopped by, for example, a red light, and the gaze position of the occupant is high to visually recognize the traffic light.

Figure 5:
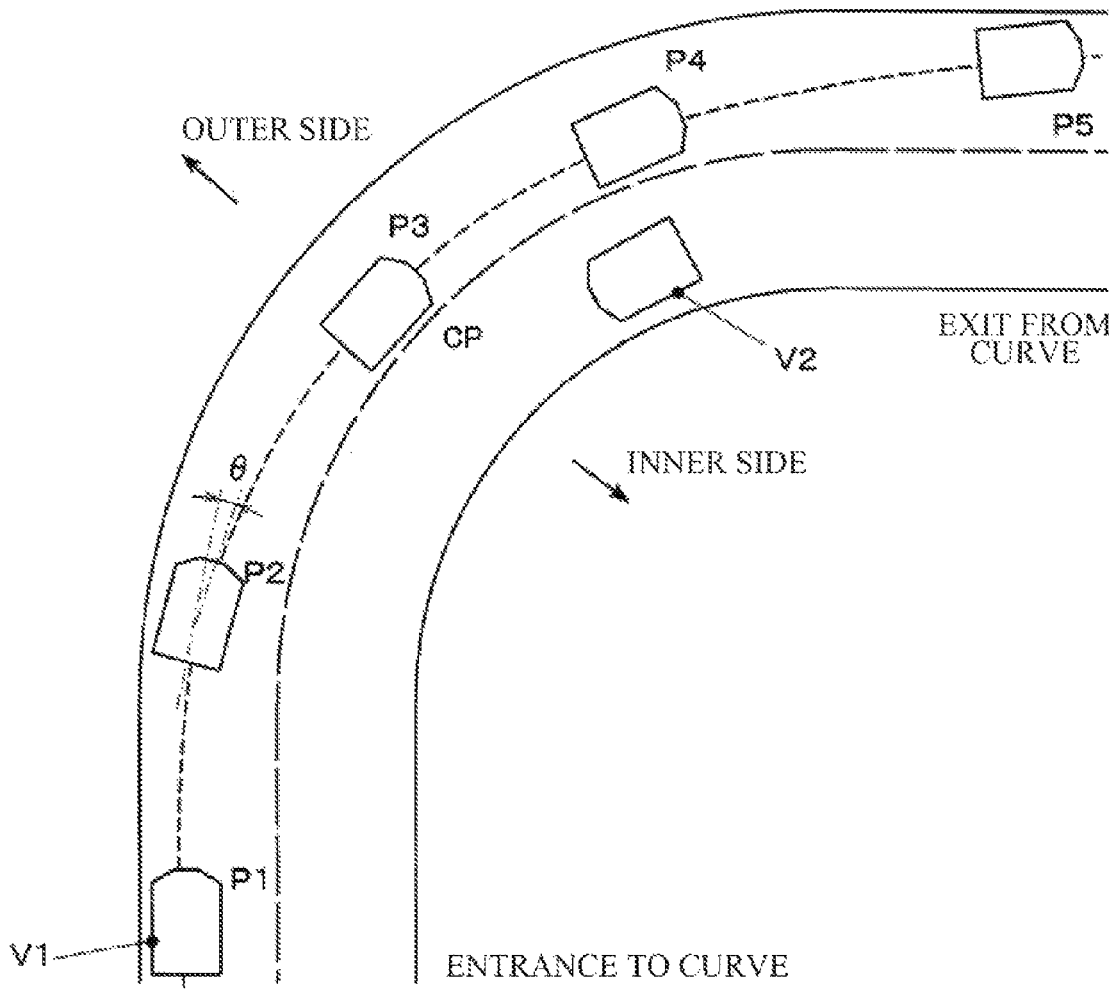
FIG. 5 is a diagram illustrating an example of a track of the vehicle when passing through a curved road.

FIG. 5 illustrates an example of a track of a vehicle when passing through a curved road.

In FIG. 5, a right curve in a case of left-side traffic is given as an example.

When driven by a highly skilled driver having relatively high driving skill, a vehicle V1 often takes a so-called "out-in-out" track to suppress a curvature of a cornering locus of the vehicle. In one example, the vehicle V1 may be the vehicle 1.

In this case, at a position P1 immediately before entering the curve, the vehicle is close to the left, or outer side, in the lane in preparation for the right curve.

Thereafter, the driver decelerates the vehicle by braking as necessary, and applies a rightward steering angle, to cause the vehicle V1 to start cornering. At a position P2 immediately after a start of cornering, the vehicle V1 has a yaw angle θ with respect to a direction of extension of the lane, to assume a posture in which the front of the vehicle body faces a clipping point CP. The clipping point CP is a position where the track is on innermost side of cornering.

When the vehicle V1 further advances to reach a position P3 where the vehicle V1 is about to pass through the clipping point, the track of the vehicle V1 is close to the innermost side within a lane width. Before or after this, the driver makes an accelerator operation, or an acceleration operation, while decreasing the steering angle, to allow the vehicle V1 to start to shift to a posture to escape toward an exit from the curve.

At a position P4 of a start of the escape, the vehicle V1 accelerates while decreasing the steering angle, and a lateral position in the lane gradually shifts to the outer side.

Thereafter, at a position P5 of an end of the escape after exiting from the curve, the steering angle becomes substantially zero, and the vehicle V1 continues to accelerate to a predetermined speed.

At this occasion, the lateral position in the lane is along the outer side of the curved road.

Driving by the highly skilled driver and driving by the low skilled driver are considered to have the following features, for example.

First, description is given of changes in the visual field.

Figure 6:
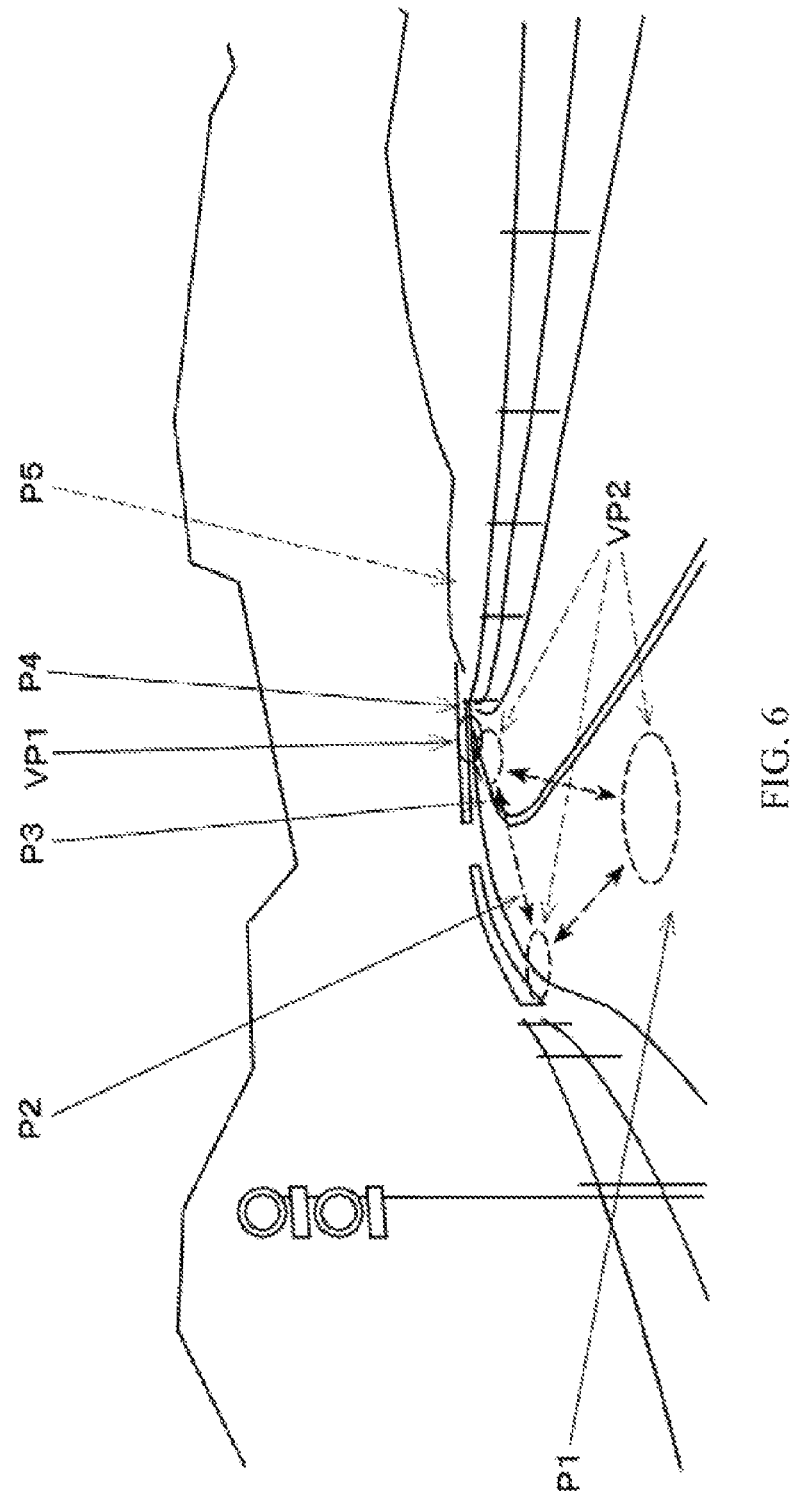
FIG. 6 is a diagram schematically illustrating a visual field to be visually recognized by the driver when the vehicle enters the curve illustrated in FIG. 5.

FIG. 6 schematically illustrates an example of a visual field to be visually recognized by the driver when the vehicle enters the curve illustrated in FIG. 5.

Here, good visibility means, for example, a case with a sufficient visual field where the exit from the curve is visible.

Poor visibility means a case with a blind corner where the exit from the curve is invisible, and a case where there is a concern of a rush out.

For example, when checking a curve with good visibility, a highly skilled driver has the central visual field located at, for example, the lane-widthwise center, while checking the situation of the surroundings by the peripheral visual field.

Thereafter, during a period from immediately before the clipping point CP to just after passing through the clipping point CP, the central visual field is located on the inner side of the curve. During this period, the vehicle travels on the innermost side of the curve. FIG. 6 illustrates an example of the central visual field VP1 of the highly skilled driver at this occasion.

After passing through the clipping point CP, when the vehicle takes the posture to escape the curve, the central visual field often shifts to the outer side and moves to, for example, near the centerline of the lane.

In the case of poor visibility as well, the basic movement of the central visual field is similar to the case of good visibility. However, a highly skilled driver has relatively small movement of the central visual field, and tends to grasp the situation of the surroundings by the peripheral visual field.

In contrast, a low skilled driver has the central visual field displaced to the outer side, even in the case of a curve with good visibility, or when entering the curve. This may result in possibility that the track of the vehicle is insufficiently checked.

FIG. 6 illustrates an example of changes in a central visual field VP2 of a low skilled driver.

Moreover, a low skilled driver sometimes gazes at the inner side of the curve during the period from immediately before the clipping point CP to just after passing through the clipping point CP, even until the vehicle exits from the curve. Thus, a low skilled driver often fails in exiting from the curve in an ideal state while shifting the track toward the outer side.

In the case of a curve having poor visibility, such a feature becomes more remarkable.

Furthermore, for example, as illustrated in FIG. 5, when an oncoming vehicle V2 is present, a low skilled driver tends to gaze at the oncoming vehicle V2 too much, and fail in visually recognizing other regions sufficiently.

In general, a low skilled driver is easily distracted from the track of the vehicle by the situation of the surroundings, and tends to fail in concentrating on road conditions ahead. Thus, a low skilled driver may possibly fail in preparing for a driving operation to be made afterwards.

With regard to the steering operation, a highly skilled driver is able to travel along a curved road with a minimum steering angle and a minimum steering operation in accordance with the situation by taking the out-in-out track mentioned above.

In contrast, a low skilled driver is afraid of taking an outwardly protruding track, and therefore, tends to keep to the lane-widthwise inner side throughout from entering the curved road to exiting from the curved road. As a result, a curvature of the track increases and the lateral acceleration rate increases, or excessive deceleration becomes necessary. Furthermore, a low skilled driver is hasty in keeping to the inner side, resulting in an excessively high steering speed and the excessively large steering angle. This contributes to a concern of lane deviation toward an opposite lane or coming close to an obstacle such as a curbstone.

With regard to a speed control, e.g., an acceleration operation and a deceleration operation, a highly skilled driver is able to decelerate to an appropriate speed before starting steering in entering the curve. A highly skilled driver is able to maintain an appropriate vehicle speed suitable for the steering angle, road surface conditions, and the surrounding environment, etc., from entering the curve to passing through the clipping point CP.

Moreover, in exiting from the curved road, a highly skilled driver is able to accelerate the vehicle by making an appropriate acceleration operation that does not disturb the behavior of the vehicle 1.

In contrast, a low skilled driver has low accuracy of a determination as to a distance to the entrance to the curved road or a curvature of the curved road, in entering the curved road. It follows that the low skilled driver may sometimes make sudden braking immediately before entering the curved road, or enter the curve at an excessively high speed.

Moreover, during the period from entering the curved road to passing through the clipping point CP, the low skilled driver may make an unnecessary deceleration operation or an unnecessary acceleration operation, resulting in a concern that the behavior of vehicle is disturbed.

Furthermore, when the vehicle exits from the curved road, a low skilled driver may become so hasty in acceleration and make an excessive acceleration operation, resulting in a concern that the behavior of the vehicle is disturbed.

To allow for stable travel regardless of the quality of the driving skill in traveling along the curved road, the driver assistance apparatus according to the embodiment may make different driver assistance controls in accordance with the skill of the driver, as described below.

Figure 7:
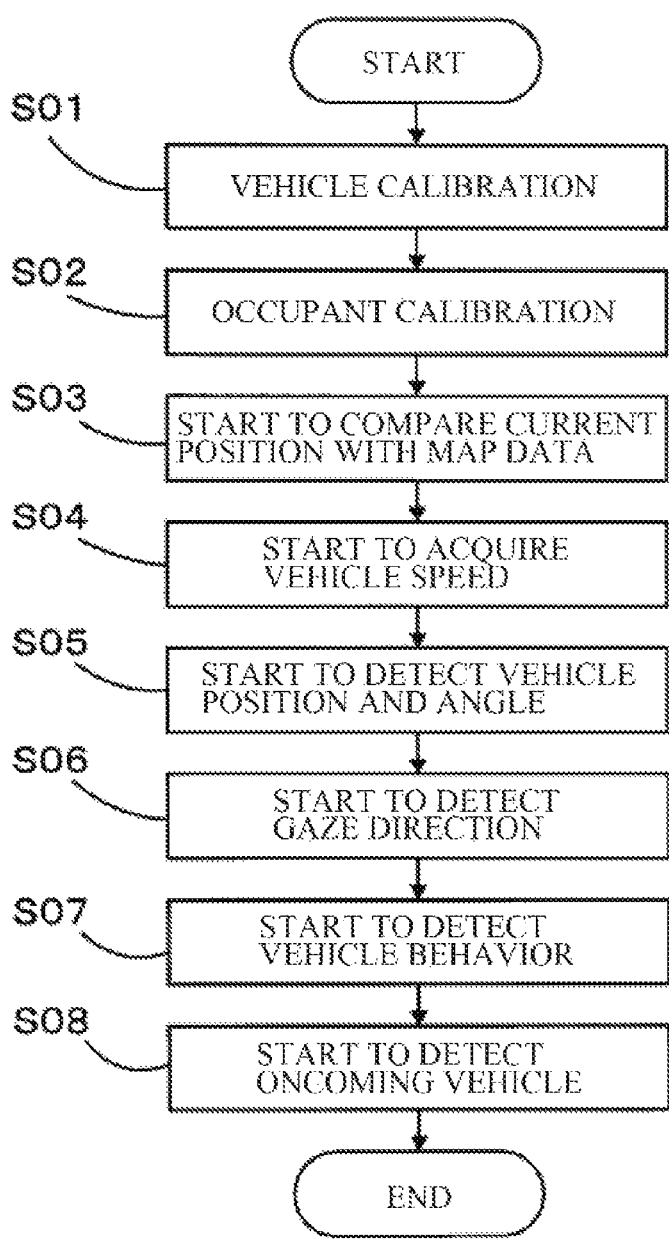
FIG. 7 is a flowchart illustrating start-up operation in the vehicle including the driver assistance apparatus according to the embodiment.

FIG. 7 is a flowchart illustrating start-up operation in the vehicle including the driver assistance apparatus according to the embodiment.

This processing may be performed, for example, every driving cycle after a main power supply of the vehicle 1 is turned on, or the ignition switch is turned on.

Here, the driving cycle refers to a period of time from the turning on of the main power supply of the vehicle 1 to turning off of the main power supply after travel to a destination.

In the following, description is given in the order of steps.

Step S01: Vehicle Calibration

The driver assistance control unit 200 may perform vehicle calibration, in cooperation with the vehicle state recognition unit 340. The vehicle calibration includes calibration and initialization of parameters related to the performance of the vehicle 1.

The vehicle calibration is carried out, for example, after a start of the driving cycle until all the following conditions are satisfied:

(a) the vehicle has passed through right-angle intersections accompanied by a stop in response to a traffic signal or a pause, a predetermined number of times (for example, three times) or more;

(b) a travel distance has reached a predetermined distance (for example, 4 km); and (c) a continuous travel distance at a predetermined speed (for example, 40 km/h) is a predetermined distance (for example, 200 m) or more.

Non-limiting examples of the parameters to be calibrated may include the spring constants and the damping characteristics of the suspension and the tire of each wheel, and a loading state of the vehicle, and load distribution to each wheel. The loading state of the vehicle may include, for example, a loading weight and the total weight of the vehicle.

It is to be noted that, until an end of the calibration, values acquired in the previous driving cycle may be used.

Thereafter, the flow may be allowed to proceed to step S02.

Step S02: Occupant Calibration

The occupant state determination unit 400 may determine the quality of the driving skill of the occupant, e.g., the driver.

At this occasion, the occupant state determination unit 400 may determine whether or not the driver is in an unsuitable state for driving. Non-limiting examples of the unsuitable state for driving may include being in a poor physical condition, having unsuitable emotions for driving, and having taken alcohol. Having unsuitable emotions for driving may include, for example, being distracted, anxious, confused, frustrated, or angry. When the driver is in the unsuitable state for driving, the occupant state determination unit 400 may give a warning to the occupant or give a notification to the base station provided outside through the driver assistance control unit 200.

Such occupant calibration may be made at any time during the driving cycle, for example, every time a duration of travel at a predetermined vehicle speed, e.g., 20 km/h, or more reaches predetermined time, e.g., 15 minutes.

It is to be noted that, until an end of the calibration, values acquired in the previous driving cycle may be used.

Thereafter, the flow may be allowed to proceed to step S03.

Step S03: Start to Compare Current Position with Map Data

The environment recognition unit 100 may start to detect the current position of the vehicle with the use of the positioning device 150.

The environment recognition unit 100 may make comparison between the current position of the vehicle and the map data accumulated in the high-precision map database 140, based on the detected current position, and grasp data regarding, for example, road shapes, e.g., the lane shapes, around the vehicle.

Thereafter, the flow may be allowed to proceed to step S04.

Step S04: Start to Acquire Vehicle Speed

The driver assistance control unit 200 may acquire, from the brake control unit 330, data regarding the vehicle speed calculated from an output of the vehicle speed sensor 332.

Thereafter, the flow may be allowed to proceed to step S05.

Step S05: Start to Detect Vehicle Position and Angle

The environment recognition unit 100 may start to detect the lateral position in the lane along which the vehicle 1 travels, and a deflection angle, or an angle, of a longitudinal direction of the vehicle body of the vehicle 1 with respect to the direction of extension of the lane, with the use of the output of each sensor. The lateral position means a vehicle-widthwise position.

Thereafter, the flow may be allowed to proceed to step S06.

Step S06: Start to Detect Gaze Direction

The occupant state determination unit 400 may start to detect the gaze direction of the driver based on the images captured by the driver monitoring camera 401. The gaze direction means the direction toward the central visual field, Thereafter, the flow may be allowed to proceed to step S07.

Step S07: Start to Detect Vehicle Behavior

The brake control unit 330 may start to detect the longitudinal, vehicle-widthwise, and vertical acceleration rates in a translational direction, and the yaw rate, each acting on the vehicle body, with the use of outputs of the acceleration rate sensor 333 and the yaw rate sensor 334.

Thereafter, the flow may be allowed to proceed to step S08.

Step S08: Start to Detect Oncoming Vehicle

The environment recognition unit 100 may start to detect other vehicles, e.g., an oncoming vehicle V2, traveling in a direction in which they approach the vehicle, along an opposite lane adjacent to the lane along which the vehicle travels, with the use of, for example, the visible light camera device 110.

Thereafter, the series of start-up processing may be ended.

After the end of the start-up processing described above, the vehicle 1 may start the following control as the vehicle 1 approaches the curved road.

Figure 8:
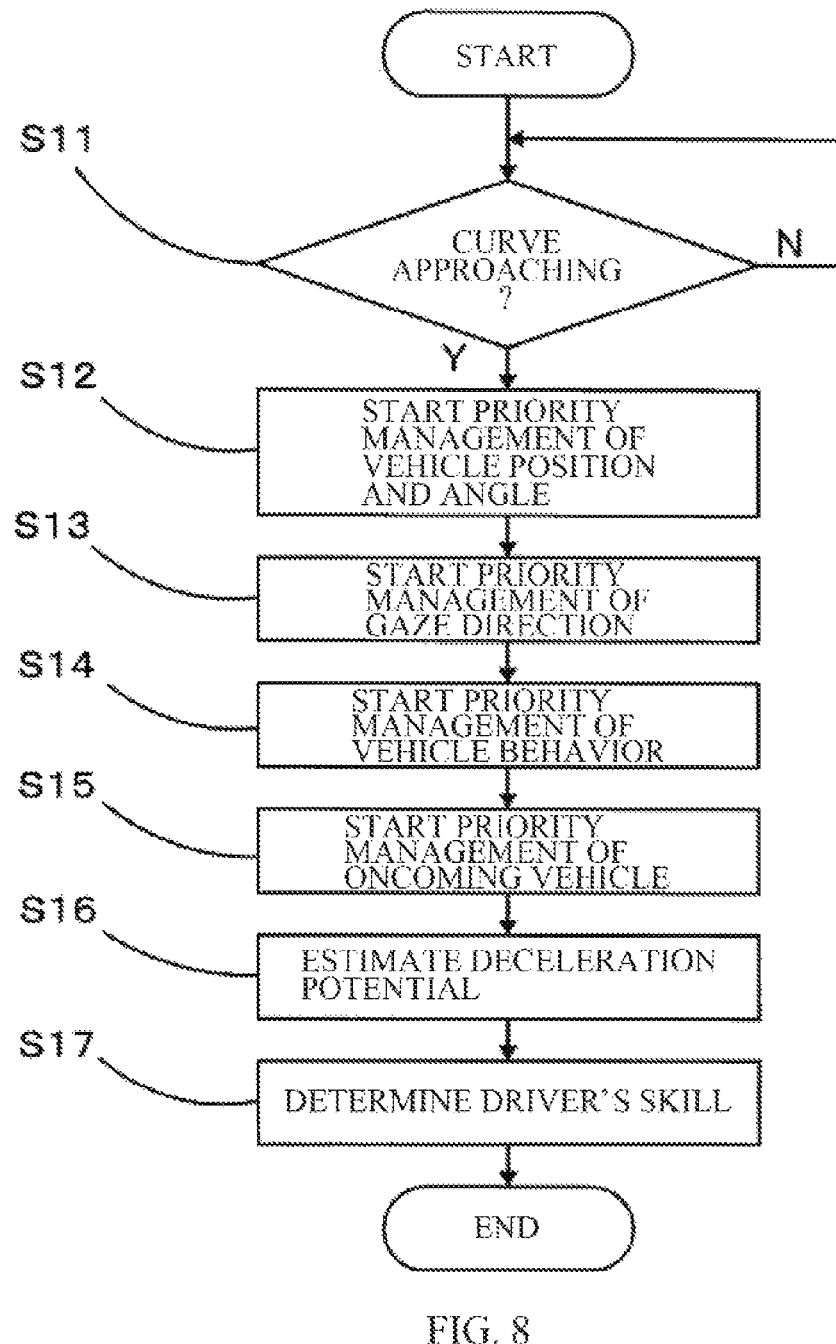
FIG. 8 is a flowchart illustrating a control in entering the curved road, in the driver assistance apparatus according to the embodiment.

FIG. 8 is a flowchart illustrating a control in entering a curved road, in the driver assistance apparatus according to the embodiment.

In the following, description is given in the order of steps.

Step S11: Determine Whether Curve is Approaching

The environment recognition unit 100 may determine whether or not the curved road is approaching ahead of the vehicle, based on the position of the vehicle detected by the positioning device 150 and the map data accumulated in the high-precision map database 140.

When the curved road is approaching until estimated arrival time is equal to or less than a predetermined value, the flow may be allowed to proceed to step S12. Otherwise, step S11 may be repeated.

Step S12: Start Priority Management of Vehicle Position and Angle

The environment recognition unit 100 may start priority management that includes detecting the lateral position in the lane of the vehicle and the angle of the longitudinal direction of the vehicle with respect to the direction of extension of the lane, with higher temporal resolution and higher spatial resolution than usual.

Thereafter, the flow may be allowed to proceed to step S13.

Step S13: Start Priority Management of Gaze Direction

The occupant state determination unit 400 may start priority management that includes detecting the gaze direction of the driver, with higher temporal resolution and higher spatial resolution than usual.

Thereafter, the flow may be allowed to proceed to step S14.

Step S14: Start Priority Management of Vehicle Behavior

The driver assistance control unit 200 may start priority management that includes detecting the longitudinal, vehicle-widthwise, and vertical acceleration rates in the translational direction, and the yaw rate, each acting on the vehicle body, with higher temporal resolution and higher spatial resolution than usual.

Thereafter, the flow may be allowed to proceed to step S15.

Step S15: Start Priority Management of Oncoming Vehicle

The environment recognition unit 100 may start priority management that includes detecting an oncoming vehicle, with higher temporal resolution and higher spatial resolution than usual.

Thereafter, the flow may be allowed to proceed to step S16.

Step S16: Estimate Deceleration Potential

The driver assistance control unit 200 may estimate a deceleration potential, based on the result of the vehicle calibration mentioned above, the current vehicle speed, and a longitudinal gradient of the lane along which the vehicle travels. The deceleration potential is a parameter related to possibility that the vehicle is able to safely decelerate to a predetermined vehicle speed by the time of the entry to the curved road. The deceleration potential may be set to lower in accordance with an increase in the loading weight of the vehicle, an increase in a degree of deviation of the load distribution to the side on which the front wheels are disposed or the side on which the rear wheels are disposed, an increase in the vehicle speed, and an increase in a downward gradient of a road surface.

Thereafter, the flow may be allowed to proceed to step S17.

Step S17: Determine Driver's Skill

The occupant state determination unit 400 may determine whether the driver is a highly skilled driver having relatively high driving skill or whether the driver is a low skilled driver having relatively low driving skill.

It is possible to determine the driving skill based on, for example, as described above, the vertical changes in the gaze direction during normal travel.

Moreover, the skill of the driver may be determined in accordance with the travel state during previous travel along the curved road. For example, in entering the curved road in an initial stage at the start of cornering at the position P2 in FIG. 5, when the yaw angle θ of the vehicle with respect to the lane is directed toward the clipping point CP, the occupant state determination unit 400 may determine that the driver is a highly skilled driver. When the yaw angle θ of the vehicle with respect to the lane is close to a parallel direction to the lane, the occupant state determination unit 400 may determine that the driver is a low skilled driver.

Thereafter, the series of processing may be ended.

Description now moves on to detailed contents of the driver assistance control in traveling along the curved road.

First, description is given of processing to be carried out when the determination is made in step S17 described above that the driver is a highly skilled driver.

Figure 9:
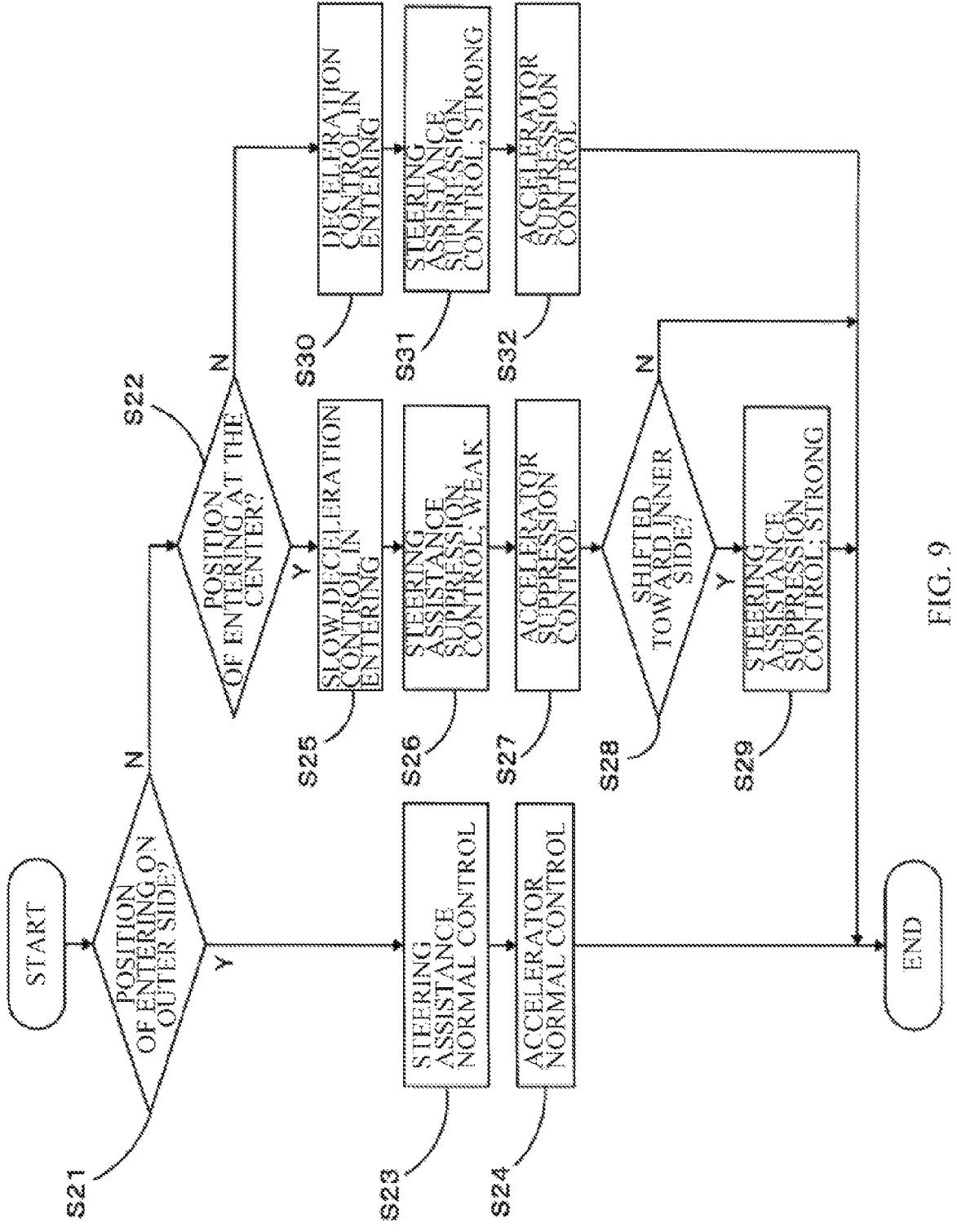
FIG. 9 is a flowchart illustrating a driver assistance control in traveling along the curved road, when a determination is made that the driver is a highly skilled driver, in the driver assistance apparatus according to the embodiment.

FIG. 9 is a flowchart illustrating the driver assistance control in traveling along the curved road when the determination is made that the driver is a highly skilled driver, in the driver assistance apparatus according to the embodiment.

In the following, description is given in the order of steps.

Step S21: Determine Whether Position of Entering is on Outer Side

The environment recognition unit 100 may determine whether or not the lateral position in the lane is within a predetermined outer region when the vehicle is at a predetermined distance from the entrance to the curved road. The outer region is set on the outer side of the curved road.

When the lateral position in the lane is within the outer region, the flow may be allowed to proceed to step S23. Otherwise, the flow may be allowed to proceed to step S22.

Step S22: Determine Whether Position of Entering is at the Center

The environment recognition unit 100 may determine whether or not the lateral position in the lane is within a predetermined center region when the vehicle is at the predetermined distance from the entrance to the curved road. The center region is set at the center portion of the lane.

When the lateral position in the lane is within the center region, the flow may be allowed to proceed to step S25. Otherwise, assuming that the vehicle is entering the curved road on the inner side, the flow may be allowed to proceed to step S30.

Step S23: Steering Assistance Normal Control

The electric power steering control unit 310 may set correlation between an output of the torque sensor 312 and the assistance force, i.e., the output of the motor 313, to a state for the normal travel.

Thereafter, the flow may be allowed to proceed to step S24.

Step S24: Accelerator Normal Control

The power unit control unit 320 may set correlation between the amount of operation of the accelerator pedal and the request torque to be used in the control of the travel power source, to a state for the normal travel.

Thereafter, the series of processing may be ended.

As described, when the highly skilled driver enters the curved road on the outer side, the driver takes the so-called out-in-out track. This often causes generation of a relatively large yaw angle θ (refer to FIG. 5) in entering the curved road, to allow the vehicle body to be directed toward the clipping point CP with respect to the direction of the lane.

Here, when the yaw angle θ of the vehicle with respect to the direction of the lane is not sufficiently large in entering the curved road at a position corresponding to, for example, the position P2 in FIG. 5, there is possibility that there has been an error in the estimation of the driving skill of the driver or possibility that the driver has made a driving mistake. Thus, it is possible to make, for example, a control of automatically braking to reduce the vehicle speed, a steering force reduction control, or a yaw moment generation control. The steering force reduction control includes increasing the assistance force by the power steering device to promote the steering operation in a direction in which the steering angle increases. The yaw moment generation control includes generating a yaw moment in the vehicle to allow the vehicle to pass through the inner side of the lane when the vehicle passes through the clipping point CP.

Step S25: Slow Deceleration Control in Entering

The driver assistance control unit 200 may give a command to the brake control unit 330, and make a deceleration control in entering. The deceleration control in entering includes automatically reducing the vehicle speed of the vehicle 1 to a predetermined target vehicle speed by the time of the entry to the curved road.

The target vehicle speed may be set in accordance with, for example, the curvature of the curved road recognized by the environment recognition unit 100 with the use of the visible light camera device 110 or the high-precision map database 140.

A deceleration rate, or the braking force, in the deceleration control in entering may be controlled to be suppressed in accordance with a decline in the deceleration potential described above.

Thereafter, the flow may be allowed to proceed to step S26.

Step S26: Steering Assistance Suppression Control; Weak

The driver assistance control unit 200 may give a command to the electric power steering control unit 310, and make a steering assistance suppression control, i.e., a steering force increase control. The steering assistance suppression control includes reducing the output of the motor 313 with respect to the output of the torque sensor 312, i.e., an amount of assistance by the electric power steering device.

This causes an increase in an operation force, or the steering force, when the driver makes the steering operation in the direction in which the steering angle increases, and an increase in a steering retention force to maintain the steering angle. Hence, it is possible to prevent an application of an excessive steering angle by an inappropriate steering operation, leading to prevention of lane deviation toward the inner side and an abnormal approach to the oncoming vehicle V2.

Thereafter, the flow may be allowed to proceed to step S27.

Step S27: Accelerator Suppression Control

The power unit control unit 320 may carry out an accelerator suppression control. The accelerator suppression control includes changing the correlation between the amount of operation of the accelerator pedal and the request torque to cause suppression of an output of the travel power source as compared to the normal state, to reduce the request torque for the same amount of operation.

Hence, it is possible to prevent the vehicle from becoming unstable because of the generation of an excessive driving force even when the skill of the driver is lower than originally estimated.

Thereafter, the flow may be allowed to proceed to step S28.

Step S28: Determine Whether Vehicle has Shifted toward Inner Side

The driver assistance control unit 200 may determine, based on an output of the environment recognition unit 100, whether or not the track of the vehicle 1 has shifted toward the inner side of the curved road by a predetermined amount or more.

For example, when the yaw angle θ of the vehicle 1 is on the inner side with respect to the direction of the lane and is equal to or larger than a predetermined threshold value, or when the lateral position in the lane of the vehicle 1 has shifted toward the inner side by the predetermined amount or more, the flow may be allowed to proceed to step S29. Otherwise, the series of processing may be ended. The inner side with respect to the direction of the lane means the side on which the clipping point CP is disposed.

Step S29: Steering Assistance Suppression Control; Strong

The driver assistance control unit 200 may give a command to the electric power steering control unit 310, and make the steering assistance suppression control; strong, i.e., the steering force increasing control; strong. The steering assistance suppression control; strong includes reducing the amount of assistance by the electric power steering device to an even smaller amount than the steering assistance suppression control; weak in step S26.

This causes a greater increase in the steering force. Hence, after the driver makes the steering control to increase the steering angle to cause the track to shift toward the inner side, it is possible to prevent, for example, the lane deviation by further increasing the steering angle because of an erroneous operation.

Thereafter, the series of processing may be ended.

Step S30: Deceleration Control in Entering

The driver assistance control unit 200 may give a command to the brake control unit 330 and make a deceleration control in entering. The deceleration control in entering includes automatically reducing the vehicle speed of the vehicle 1 to a predetermined target vehicle speed by the time of the entry to the curved road.

The deceleration rate in the deceleration control in entering may be controlled to be suppressed in accordance with the decline in the deceleration potential described above. Moreover, the target vehicle speed may be set to be low with respect to the slow deceleration control in entering in step S25.

Thereafter, the flow may be allowed to proceed to step S31.

Step S31: Steering Assistance Suppression Control; Strong

The driver assistance control unit 200 may give a command to the electric power steering control unit 310, and make the steering assistance suppression control; strong, i.e., the steering force increasing control; strong. The steering assistance suppression control; strong includes reducing the amount of assistance by the electric power steering device to the even smaller amount than the steering assistance suppression control; weak in step S26.

Thereafter, the flow may be allowed to proceed to step S32.

Step S32: Accelerator Suppression Control

The power unit control unit 320 may make the accelerator suppression control. The accelerator suppression control includes changing the correlation between the amount of operation of the accelerator pedal and the request torque to cause the suppression of the output of the travel power source as compared to the normal state, to reduce the request torque for the same amount of operation.

Thereafter, the series of processing may be ended.

Figure 10:
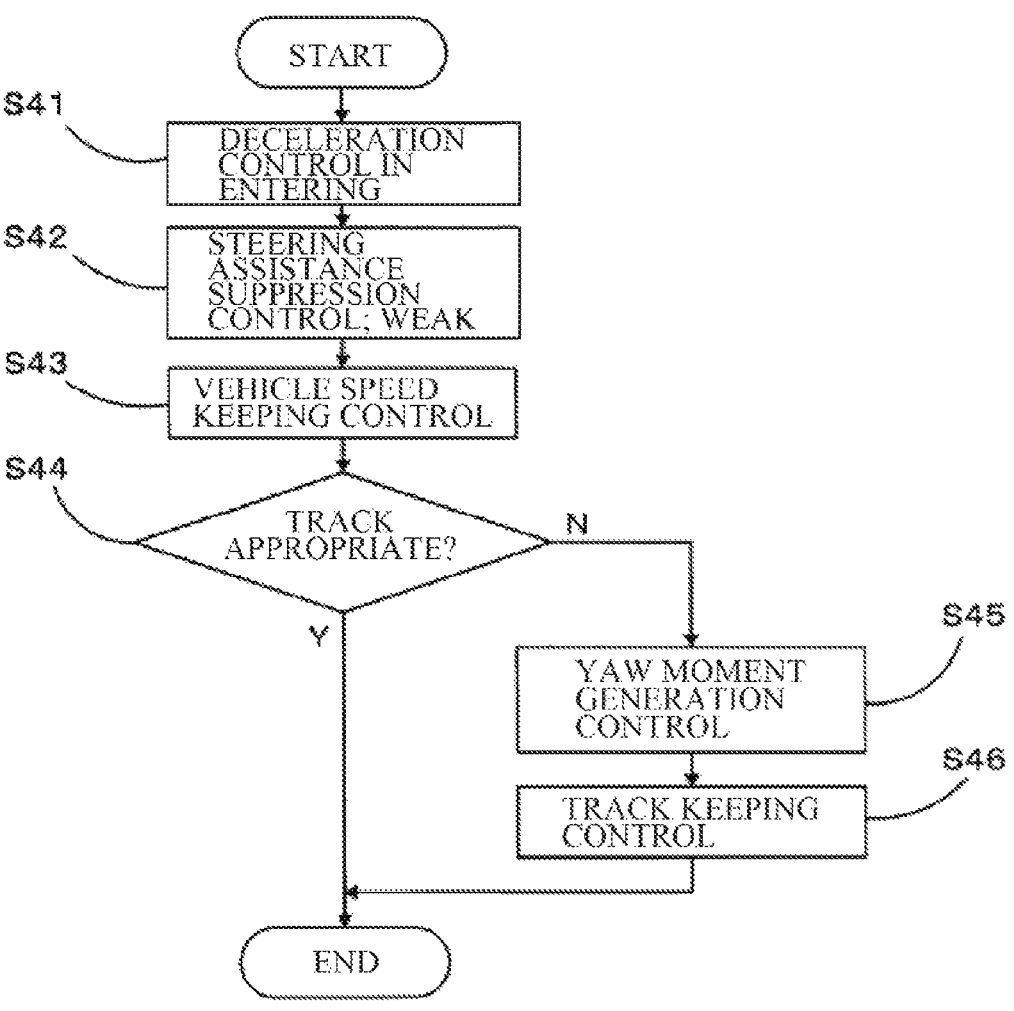
FIG. 10 is a flowchart illustrating the driver assistance control in traveling along the curved road, when a determination is made that the driver is a low skilled driver, in the driver assistance apparatus according to the embodiment.

FIG. 10 is a flowchart illustrating the driver assistance control in traveling along the curved road when the determination has been made that the driver is a low skilled driver, in the driver assistance apparatus according to the embodiment.

In the following, description is given in the order of steps.

Step S41: Deceleration Control in Entering

The driver assistance control unit 200 may give a command to the brake control unit 330 and make the deceleration control in entering. The deceleration control in entering includes automatically reducing the vehicle speed of the vehicle 1 to the predetermined target vehicle speed by the time of the entry to the curved road.

Here, the target vehicle speed may be set to be even lower than the target vehicle speed in step S30 described above.

Thereafter, the flow may be allowed to proceed to step S42.

Step S42: Steering Assistance Suppression Control; Weak

The driver assistance control unit 200 may give a command to the electric power steering control unit 310 and make the steering assistance suppression control, i.e., the steering force increasing control. The steering assistance suppression control includes reducing the amount of assistance by the electric power steering device. At this occasion, an amount of reduction in the amount of assistance may be set, for example, to be equal to or substantially equal to that in step S26 described above.

Thereafter, the flow may be allowed to proceed to step S43.

Step S43: Vehicle Speed Keeping Control

The driver assistance control unit 200 may make a vehicle speed keeping control in cooperation with the power unit control unit 320 and the brake control unit 330. The vehicle speed keeping control includes keeping the vehicle speed of the vehicle 1 at a predetermined target vehicle speed in passing through a curve.

While the vehicle speed keeping control is being carried out, the accelerator operation by the driver is disabled or suppressed.

Thereafter, the flow may be allowed to proceed to step S44.

Step S44: Determine Whether or Not Track is Appropriate

The driver assistance control unit 200 may calculate an amount of lane-widthwise deviation between a predetermined target track and a track along which the vehicle 1 is actually traveling, with the use of the recognition result by the environment recognition unit 100. The target track is a track along which the vehicle 1 passes through the clipping point CP on the inner side of the lane.

It is to be noted that when the environment recognition unit 100 recognizes the oncoming vehicle V2 approaching the vehicle, the target track may be set to be offset toward the outer side with respect to a case where no oncoming vehicles are recognized.

When the amount of the deviation between the target track and the actual track is equal to or larger than a predetermined value, the flow may be allowed to proceed to step S45, assuming that intervention by a control of changing the track is desirable. Otherwise, the current control is continued until the vehicle exits from the curved road. Thereafter, the series of processing may be ended.

Step S45: Yaw Moment Generation Control

The driver assistance control unit 200 may give a command to the brake control unit 330 and carry out the yaw moment generation control. The yaw moment generation control includes generating a yaw moment in a direction in which the vehicle 1 is brought closer to the target track by a difference in the braking force between the right and left wheels.

Instead of the generation of such a difference in the braking force, the driver assistance control unit 200 may give a command to the electric power steering control unit 310 and allow the motor 313 to control the steering angle of the steering device, to generate the yaw moment in the vehicle 1.

Thereafter, the flow may be allowed to proceed to step S46.

Step S46: Track Keeping Control

The driver assistance control unit 200 may continue the control of the yaw moment started in step S45, to allow the vehicle 1 to travel along the target track.

Thereafter, the vehicle 1 exits from the curved road, and afterwards, each of the driver assistance controls may be ended, and the series of processing may be ended.

As described, according to the embodiment, it is possible to obtain the following effects.

(1) The estimation of the driving skill of the driver is made at least once in each driving cycle. Hence, it is possible to appropriately estimate the driving skill of the driver even when the driving skill of the driver changes with everyday body condition, fatigue, and emotional change.

Moreover, the contents of the driver assistance control is changed in accordance with the estimated driving skill. Hence, it is possible to provide appropriate driver assistance.

(2) During one driving cycle, the estimation of the driving skill may be sequentially repeated at the predetermined intervals. Hence, it is possible to reflect, in the driver assistance control, the changes in the driving skill during the driving cycle because of the changes in the body condition of the driver.

(3) The estimation of the driving skill may be made based on the history of the gaze direction of the driver and the yaw angle of the vehicle with respect to the direction of extension of the lane in one or both of entering the curved road and traveling along the curved road. Hence, it is possible to accurately estimate the driving skill of the driver in traveling along the curved road.

(4) The detection of the performance of the vehicle, i.e., the vehicle calibration, may be carried out at least once in each driving cycle of the vehicle. Hence, it is possible to make the appropriate driver assistance control that reflects influences of, for example, the loading state of occupants and loads, the changes in the environment such as temperatures and road surface conditions, and temporal changes of the vehicle.

(5) The vehicle calibration may include acquiring data regarding the characteristic of the tire, the characteristic of the suspension device, the total weight of the vehicle, and the weight distribution of the vehicle. Hence, it is possible to appropriately grasp the performance of the vehicle that correlates closely to the driver assistance control, and to ensure the forging effects.

As described, according to the embodiment, it is possible to provide a driver assistance apparatus that makes it possible to provide appropriate driver assistance corresponding to changes in driving skill of a driver.

MODIFICATION EXAMPLES

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the driving skill estimation device, the driver assistance apparatus, and the vehicle on which they are mounted, and the contents of the driver assistance control are not limited to the forgoing embodiments but may be altered as appropriate.

(2) The examples of the logic of estimating and determining the driving skill of the driver is not limited to the configurations of the forgoing embodiments, but may be altered as appropriate. For example, the driving skill of the driver may be determined based on frequency of sway in the lane, variations in accelerator operations and brake operations, and frequency of intervention by a behavior stabilization control and an antilock brake system (ABS) control.

(3) In the forgoing embodiments, an amount of rise in the shoulder, or the clavicle, of the driver is detected based on the captured images of the driver monitoring camera, but the disclosure is not limited thereto. The skeleton state of the driver may be detected by other methods. For example, the rise in the shoulder of the driver may be recognized based on an output of the seat surface pressure sensor provided at the backrest.

The example embodiment described above explains an example of a driving skill estimation device in the case where the vehicle travels on a road where drivers keep to the left by law. Needless to say, if the driver skill estimation device is to be applied to a road where drivers keep to the right by law, left and right settings or the like may be appropriately set in an opposite manner.

The environment recognition unit 100, the driver assistance control unit 200, the electric power steering control unit 310, the power unit control unit 320, the brake control unit 330, the vehicle state recognition unit 340, and the occupant state determination unit 400 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the environment recognition unit 100, the driver assistance control unit 200, the electric power steering control unit 310, the power unit control unit 320, the brake control unit 330, the vehicle state recognition unit 340, and the occupant state determination unit 400. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the environment recognition unit 100, the driver assistance control unit 200, the electric power steering control unit 310, the power unit control unit 320, the brake control unit 330, the vehicle state recognition unit 340, and the occupant state determination unit 400 illustrated in FIG. 1.

The invention claimed is:

1. A driver assistance apparatus comprising:
an environment recognition unit configured to recognize an environment around a vehicle;
a travel state detection unit configured to detect a travel state of the vehicle;
a driving skill estimation unit configured to perform estimation of driving skill of a driver, based on variations in driving behavior derived from driving data of the driver, and to classify the estimated driving skill into one of predefined driving skill levels;
a driver assistance control unit configured to:
select a mode of a driver assistance control in accordance with the classified driving skill level of the driver estimated by the driving skill estimation unit; and

perform the selected mode of the driver assistance control based on an output of the environment recognition unit regarding the environment and an output of the travel state detection unit regarding the travel state, the driver assistance control including assisting the driver in one or both of entering a curved road and traveling along the curved road,
wherein the driving skill estimation unit is further configured to perform the estimation of the driving skill at least once in each driving cycle of the vehicle, and
wherein the driving skill estimation unit is configured to estimate the driving skill based on at least one of:
a variance of a gaze position in a vertical direction of the vehicle;
a standard deviation of the gaze position;
a frequency of vertical movement of gaze of the driver; and
an average value of an amount of the vertical movement of the gaze.

2. The driver assistance apparatus according to claim 1, wherein
the driving skill estimation unit is configured to, during one driving cycle of the vehicle, sequentially repeat the estimation of the driving skill at predetermined intervals.

3. The driver assistance apparatus according to claim 2, further comprising:
a gaze direction detection unit configured to detect a gaze direction of the driver; and
a yaw angle detection unit configured to detect a yaw angle of the vehicle with respect to a lane on which the vehicle travels,
wherein the driving behavior of the driver includes a history of the gaze direction of the driver detected by the gaze direction detection unit and a history of the yaw angle of the vehicle with respect to a direction of extension of the lane in one or both of entering the curved road and traveling along the curved road.

4. The driver assistance apparatus according to claim 2, further comprising a vehicle performance detection unit configured to detect performance of the vehicle,
wherein the driver assistance control unit is configured to select the mode of the driver assistance control, in accordance with a change in the performance of the vehicle detected by the vehicle performance detection unit in addition to the classified driving skill level of the driver estimated by the driving skill estimation unit, and
wherein the vehicle performance detection unit is configured to detect the performance of the vehicle at least once in each driving cycle of the vehicle.

5. The driver assistance apparatus according to claim 4, wherein detecting the performance of the vehicle by the vehicle performance detection unit includes detecting one or more of a characteristic of a tire of the vehicle, a characteristic of a suspension device of the vehicle, a total weight of the vehicle, and weight distribution of the vehicle.

6. The driver assistance apparatus according to claim 2, further comprising an occupant state determination unit configured to detect one or more driver states,
wherein the driver assistance control unit is configured to select the mode of the driver assistance control, in accordance with the detected one or more driver states in addition to the classified driving skill level of the driver estimated by the driving skill estimation unit, and the occupant state determination unit is configured to detect the one or more driver states at least once in each driving cycle of the vehicle.

7. The driver assistance apparatus according to claim 6, wherein detecting the one or more driver states by the occupant state determination unit includes one or more of a consciousness state of the driver, an emotional state of the driver, and a health state of the driver.

8. The driver assistance apparatus according to claim 2, wherein in the driving cycle, which is defined as a period of time from turning on of a main power supply of the vehicle to turning off of the main power supply, the driving skill estimation unit is configured to repeatedly estimate the driving skill at predetermined intervals, and the driver assistance control unit is configured to reflect, in the driver assistance control, changes in the driving skill during the driving cycle resulting from changes in a physical condition of the driver.

9. The driver assistance apparatus according to claim 1, further comprising:

a gaze direction detection unit configured to detect a gaze direction of the driver; and a yaw angle detection unit configured to detect a yaw angle of the vehicle with respect to a lane on which the vehicle travels, wherein the driving behavior of the driver includes a history of the gaze direction of the driver detected by the gaze direction detection unit and a history of the yaw angle of the vehicle with respect to a direction of extension of the lane in one or both of entering the curved road and traveling along the curved road.

10. The driver assistance apparatus according to claim 1, further comprising a vehicle performance detection unit configured to detect performance of the vehicle, wherein the driver assistance control unit is configured to select the mode of the driver assistance control, in accordance with a change in the performance of the vehicle detected by the vehicle performance detection unit in addition to the classified driving skill level of the driver estimated by the driving skill estimation unit, and wherein the vehicle performance detection unit is configured to detect the performance of the vehicle at least once in each driving cycle of the vehicle.

11. The driver assistance apparatus according to claim 10, wherein detecting the performance of the vehicle by the vehicle performance detection unit includes detecting one or more of a characteristic of a tire of the vehicle, a characteristic of a suspension device of the vehicle, a total weight of the vehicle, and weight distribution of the vehicle.

12. The driver assistance apparatus according to claim 1, further comprising an occupant state determination unit configured to detect one or more driver states, wherein the driver assistance control unit is configured to select the mode of the driver assistance control, in accordance with the detected one or more driver states in addition to the classified driving skill level of the driver estimated by the driving skill estimation unit, and the occupant state determination unit is configured to detect the one or more driver states at least once in each driving cycle of the vehicle.

13. The driver assistance apparatus according to claim 12, wherein detecting the one or more driver states by the occupant state determination unit includes one or more of a consciousness state of the driver, an emotional state of the driver, and a health state of the driver.

14. The driver assistance apparatus according to claim 1, wherein the driving cycle is defined as a period from ignition-on to ignition-off of the vehicle.

15. The driver assistance apparatus according to claim 1, wherein in the driving cycle, which is defined as a period of time from turning on of a main power supply of the vehicle to turning off of the main power supply, the driving skill estimation unit is configured to repeatedly estimate the driving skill at predetermined intervals, and the driver assistance control unit is configured to reflect, in the driver assistance control, changes in the driving skill during the driving cycle resulting from changes in a physical condition of the driver.

16. A driver assistance apparatus comprising circuitry configured to:

recognize environment around a vehicle;

detect a travel state of the vehicle;

perform estimation of driving skill of a driver, based on variations in driving behavior derived from driving data of the driver, and to classify the estimated driving skill into one of predefined driving skill levels;

select a mode of a driver assistance control in accordance with the classified driving skill level of the driver; and perform the selected mode of driver assistance control based on the environment around the vehicle and the travel state of the vehicle, the driver assistance control including assisting the driver in driving in one or both of entering a curved road and traveling along the curved road, wherein the circuitry is further configured to perform the estimation of the driving skill at least once in each driving cycle of the vehicle wherein the circuitry is further configured to estimate the driving skill based on at least one of:

a variance of a gaze position in a vertical direction of the vehicle;

a standard deviation of the gaze position;

a frequency of vertical movement of gaze of the driver; and an average value of an amount of the vertical movement of the gaze.

* * * * *